US009032009B2

(12) United States Patent  
Goyal et al.

(10) Patent No.: US 9,032,009 B2  
(45) Date of Patent: May 12, 2015

(54) MULTIPLIER CIRCUIT

(71) Applicants: Rohit Goyal, Sirsa (IN); Amit Kumar Dey, Kolkata (IN)

(72) Inventors: Rohit Goyal, Sirsa (IN); Amit Kumar Dey, Kolkata (IN)

(73) Assignee: Freescale Semicondutor, Inc., Austin, TX (US)

(*) Notice: Subject to any disclaimer, the term of this patent is extended or adjusted under 35 U.S.C. 154(b) by 325 days.

(21) Appl. No.: 13/794,739

(22) Filed: Mar. 11, 2013

(65) Prior Publication Data

US 2014/0253214 A1    Sep. 11, 2014

(51) Int. Cl.
  *G06F 7/533*  (2006.01)
  *G06F 7/527*  (2006.01)
  *G06F 7/74*   (2006.01)

(52) U.S. Cl.
  CPC .............. *G06F 7/5272* (2013.01); *G06F 7/74* (2013.01)

(58) Field of Classification Search
  CPC ......... G06F 7/52; G06F 7/533; G06F 7/5332; G06F 7/5336; G06F 7/525; G06F 7/527
  USPC ....................................................... 708/674
  See application file for complete search history.

(56) References Cited

U.S. PATENT DOCUMENTS

| 4,718,031 | A  | * | 1/1988  | Nukiyama ................ 708/625 |
| 4,807,175 | A  |   | 2/1989  | Tokumaru et al. |
| 4,887,232 | A  |   | 12/1989 | Wolrich et al. |
| 5,031,135 | A  |   | 7/1991  | Patel et al. |
| 6,167,420 | A  |   | 12/2000 | Saishi et al. |
| 6,202,078 | B1 |   | 3/2001  | Kikuchi et al. |
| 8,364,741 | B2 | * | 1/2013  | Katayama ................ 708/626 |

OTHER PUBLICATIONS

Cooper, A.R., Parallel architecture modified Booth multiplier, Electronic Circuits and Systems, IEE Proceedings G, vol. 135, Issue 3, Jun. 1988, pp. 125-128.

* cited by examiner

*Primary Examiner* — Chat Do  
*Assistant Examiner* — Calvin M Brien  
(74) *Attorney, Agent, or Firm* — Charles Bergere

(57) ABSTRACT

A multiplier circuit for multiplying first and second binary values includes a first logic circuit, a priority encoder, a shifter circuit, and an accumulator. The first logic circuit receives the first binary value and a multiplier modifier, and modifies the first binary value based on the multiplier modifier. The multiplier modifier is generated by the priority encoder. The priority encoder also generates a position binary value indicating the position of a most significant set bit in the modified first binary value. The shifter circuit receives the position binary value from the priority encoder and the second binary value and generates an intermediate result. The accumulator accumulates one or more of the intermediate results and generates a final product that is a product of the first and second binary values.

5 Claims, 4 Drawing Sheets

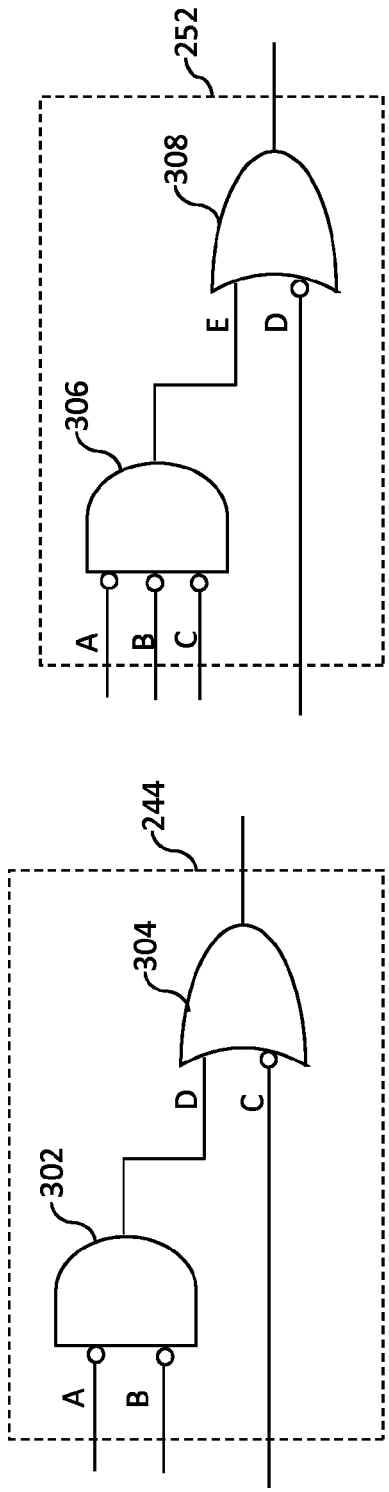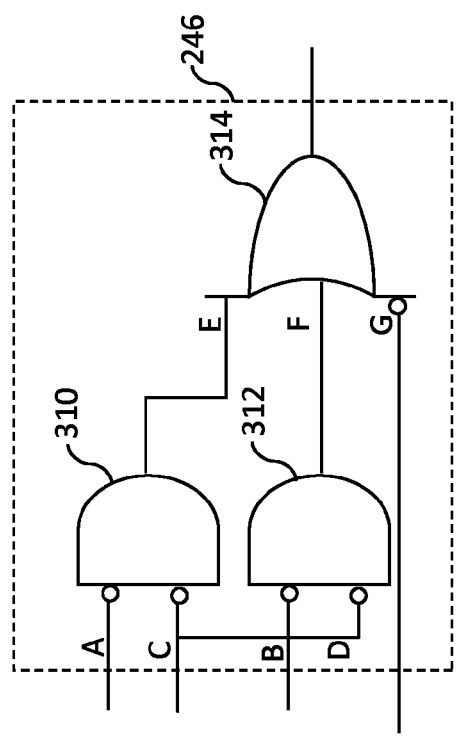
FIG. 3A
FIG. 3B
FIG. 3C

US 9,032,009 B2

MULTIPLIER CIRCUIT

BACKGROUND OF THE INVENTION

The present invention generally relates to digital circuits, and, more particularly, to a binary multiplier circuit.

With the advent of technologies that require complex and fast data processing, digital systems have evolved to perform large numbers of mathematical operations in lesser time. Since multiplication is the most basic form of mathematical operation performed by a digital system, different algorithms, such as Booth's multiplication algorithm, have been developed to reduce the time for a digital system to multiply two numbers.

Booth's multiplication algorithm performs multiplication based on shift and add operations. A conventional Booth's multiplier circuit includes a multiplexer or mux, an accumulator, and a binary shifter. Bits of a multiplicand are provided to a first input terminal of the mux. A second input terminal of the mux receives binary zero as input. Bits of a multiplier are provided serially to a select input terminal of the mux by right-shifting and providing the least significant bit (LSB) first. Inputs at the first and second input terminals of the mux are selected based on the bits provided at the select input terminal thereof. The mux output is provided to the accumulator. The multiplicand is added to a previous intermediate result stored in the accumulator for bits of the multiplier that are set to binary one and the result is right-shifted. The previous intermediate result is right-shifted, without the addition of the multiplicand, for the bits of the multiplier that are set to binary zero.

Since the intermediate result stored in the accumulator needs to be shifted for each bit of the multiplier, generating a final result requires a count of clock cycles equal to the bit-length of the multiplier, irrespective of a value of the bit. Thus, 8 clock cycles are required for multiplying an 8-bit multiplier and multiplicand and 16 clock cycles are required for multiplying a 16-bit multiplier and multiplicand. The number of clock cycles, and therefore the time required for multiplication increases in direct proportion to the bit-length of the multiplier, which limits the performance of the conventional Booth multiplier.

It would be advantageous to have a multiplier circuit that is fast, consumes fewer clock cycles, and that overcomes the above-mentioned limitations of conventional multiplier circuits.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIGS. 3A, 3B, and 3C are schematic block diagrams of second, sixth, and third logic circuits, respectively, in accordance with an embodiment of the present invention.

DETAILED DESCRIPTION OF THE PRESENT INVENTION

Figure 1:
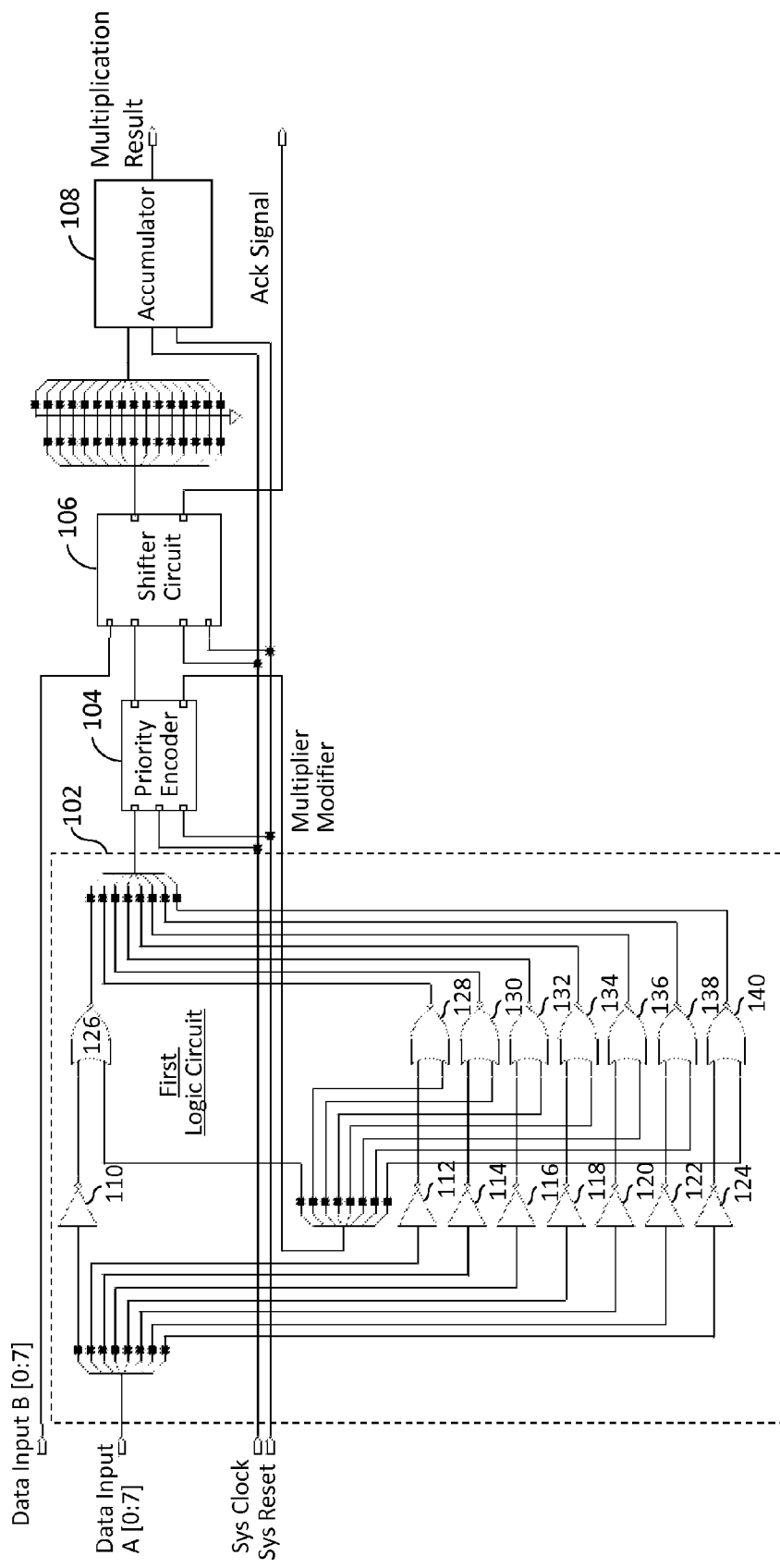
FIG. 1 is a schematic block diagram depicting a multiplier circuit in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein the term multiplexer has been abbreviated as mux.

In an embodiment of the present invention, a multiplier circuit for multiplying first and second binary values is provided. The multiplier circuit includes a first logic circuit for receiving the first binary value and a multiplier modifier and resetting a set bit detected in a previous iteration of the multiplier circuit to generate a modified first binary value based on the multiplier modifier. The multiplier circuit further includes a priority encoder connected to the first logic circuit for receiving the modified first binary value, detecting a most significant set bit in the modified first binary value, generating a position binary value that includes a position of the most significant set bit, and generating the multiplier modifier. The multiplier circuit further includes a shifter circuit connected to the priority encoder for receiving the second binary value and the position binary value generated in a current iteration of the multiplier circuit, generating a first intermediate product by left-shifting the second binary value by a count equal to the position of the most significant set bit, and generating a result acknowledgement signal when the multiplication of the first and second binary values is finished. The multiplier circuit further includes an accumulator connected to the shifter circuit for receiving and accumulating one or more intermediate products generated by the shifter circuit during one or more iterations of the multiplier circuit to generate a final product that is a product of the first and second binary values.

In another embodiment of the present invention, a multiplier circuit for multiplying first and second binary values is provided. The multiplier circuit includes a first logic circuit for receiving the first binary value and a multiplier modifier and resetting a set bit detected in a previous iteration of the multiplier circuit to generate a modified first binary value based on the multiplier modifier. The first logic circuit includes first through eighth NOT gates for receiving first through eighth bits of the first binary value, respectively, and generating inverted first through eighth bits, respectively. The first logic circuit further includes first through eighth NOR gates connected to the first through eighth NOT gates, respectively, for receiving the inverted first through eighth bits of the first binary value and first through eighth bits of the multiplier modifier, and generating first through eighth bits of the modified first binary value.

The multiplier circuit further includes a priority encoder connected to the first logic circuit for receiving the modified first binary value, detecting a most significant set bit in the modified first binary value, generating a position binary value that includes a position of the most significant set bit, and generating the multiplier modifier. The priority encoder includes a ninth NOT gate for receiving and inverting the first bit of the modified first binary value to generate the inverted first bit of the modified first binary value. Further, a first NAND gate is connected to the ninth NOT gate for receiving the inverted first bit and the second bit of the modified first binary value at first and second input terminals thereof, respectively, and generating a first intermediate bit at an output terminal thereof. A tenth NOT gate is connected to the output terminal of the first NAND gate for receiving the first intermediate bit and generating an inverted first intermediate bit. A first AND gate is connected to the tenth NOT gate for receiving the inverted first intermediate bit and the third bit of the modified first binary value and generating a second intermediate bit at an output terminal thereof. A ninth NOR gate is connected to the output terminal of the first AND gate and the ninth NOT gate for receiving the second intermediate bit and the inverted first bit of the modified first binary value and generating a third intermediate bit at an output terminal thereof. A tenth NOR gate is provided for receiving the fourth and fifth bits of the modified first binary value and generating a fourth intermediate bit at an output terminal thereof. Further, an eleventh NOT gate for receiving and inverting the sixth bit of the modified first binary value to generate an inverted sixth bit of the modified first binary value is provided. A twelfth NOT gate is provided for receiving and inverting the seventh bit of the modified first binary value to generate an inverted seventh bit of the modified first binary value. A second NAND gate is connected to the twelfth NOT gate for receiving the eighth and inverted seventh bits of the modified first binary value at first and second input terminals thereof, respectively, and generating a fifth intermediate bit at an output terminal thereof. A first OR gate is provided for receiving the first and second bits of the modified first binary value at first and second input terminals thereof, respectively, and generating a sixth intermediate bit at an output terminal thereof. A thirteenth NOT gate is provided for receiving and inverting the sixth intermediate bit to generate an inverted sixth intermediate bit. A fourteenth NOT gate is provided for receiving and inverting the fourth bit of the modified first binary value to generate an inverted fourth bit of the modified first binary value. A fifteenth NOT gate is provided for receiving and inverting the third bit of the modified first binary value to generate an inverted third bit of the modified first binary value. A third NAND gate is connected to the thirteenth through fifteenth NOT gates for receiving the inverted sixth intermediate bit, and inverted third and fourth bits of the modified first binary value at first through third input terminals thereof, respectively, and generating a seventh intermediate bit at an output terminal thereof. A sixteenth NOT gate is provided for receiving and inverting the seventh intermediate bit to generate an inverted seventh intermediate bit. A seventeenth NOT gate is provided for receiving and inverting the fifth bit of the modified first binary value to generate an inverted fifth bit of the modified first binary value. A fourth NAND gate is connected to the sixteenth, seventeenth, and eleventh NOT gates for receiving the inverted seventh intermediate and the inverted fifth and sixth bits of the modified first binary value at first through third input terminals thereof, respectively, and generating an eighth intermediate bit at an output terminal thereof. An eighteenth NOT gate is provided for receiving and inverting the eighth bit of the modified first binary value to generate an inverted eighth bit of the modified first binary value. A second logic circuit is connected to the tenth NOR gate for receiving the fourth intermediate bit and sixth and seventh bits of the modified first binary value and generating a ninth intermediate bit at an output terminal thereof. A third logic circuit is connected to the second NAND gate, and the eleventh and fourteenth NOT gates, for receiving the fifth intermediate bit, the fifth bit, and the inverted fourth and sixth bits of the modified first binary value and generating a tenth intermediate bit at an output terminal thereof. A nineteenth NOT gate is connected to the output terminal of the third logic circuit for receiving and inverting the tenth intermediate bit and generating an inverted tenth intermediate bit. A fourth logic circuit is connected to the ninth and tenth NOR gates for receiving the third and fourth intermediate bits, and first bit of the modified first binary value and generating an eleventh intermediate bit at an output terminal thereof. A fifth logic circuit is connected to the output terminal of the second logic circuit and the ninth NOR gate for receiving the third intermediate bit, the first bit of the modified first binary value, and the ninth intermediate bit and generating a twelfth intermediate bit at an output terminal thereof. A sixth logic circuit is connected to the nineteenth NOT gate and the first NAND gate for receiving the first and inverted tenth intermediate bits, and the first and third bits of the modified first binary value and generating a thirteenth intermediate bit at an output terminal thereof. A second OR gate is provided for receiving the first bit of the modified first binary value, a fourteenth intermediate bit, and generating a fifteenth intermediate bit at an output terminal thereof. A third OR gate is connected to the tenth NOT gate for receiving the inverted first intermediate bit and a sixteenth intermediate bit and generating a seventeenth intermediate bit at an output terminal thereof. A seventh logic circuit is connected to the first OR gate and the fifteenth NOT gate for receiving the sixth intermediate bit, the inverted third bit of the modified first binary value, and an inverted eighteenth intermediate bit and generating a nineteenth intermediate bit at an output terminal thereof. An eighth logic circuit is connected to the first OR gate and the fourteenth NOT gate for receiving the sixth intermediate bit, the third bit and inverted fourth bit of the modified first binary value, and a inverted twentieth intermediate bit and generating a twenty-first intermediate bit at an output terminal thereof. A ninth logic circuit is connected to the output terminal of the third NAND gate, the seventeenth NOT gate for receiving the inverted fifth bit of the modified first binary value, the seventh intermediate bit, and a inverted twenty-second intermediate bit and generating a twenty-third intermediate bit at an output terminal thereof. A tenth logic circuit is connected to the eleventh NOT gate and the third NAND gate for receiving the seventh intermediate bit, the fifth and inverted sixth bits of the modified first binary value, and a inverted twenty-fourth intermediate bit and generating a twenty-fifth intermediate bit at an output terminal thereof. An eleventh logic circuit is connected to the twelfth NOT gate and the fourth NAND gate for receiving the inverted seventh bit of the modified first binary value, the eighth intermediate bit, and a inverted twenty-sixth intermediate bit and generating a twenty-seventh intermediate bit at an output terminal thereof. A twelfth logic circuit is connected to the eighteenth NOT gate and the fourth NAND gate for receiving the eighth intermediate bit, the seventh and inverted eighth bits of the modified first binary value, and a inverted twenty-eighth intermediate bit and generating a twenty-ninth intermediate bit at an output terminal thereof. The priority encoder further includes a first flip-flop having an input terminal for receiving the first bit of the modified first binary value, a clock input terminal for receiving a system clock signal, and a reset input terminal for receiving a system reset signal. The first flip-flop generates a fourth bit of the position binary value at an output terminal thereof. A second flip-flop is provided having an input terminal connected to the output terminal of the fourth logic circuit for receiving the eleventh intermediate bit, a clock input terminal for receiving the system clock signal, and a reset input terminal for receiving the system reset signal. The second flip-flop generates a third bit of the position binary value at an output terminal thereof. A third flip-flop is provided having an input terminal connected to the output terminal of the fifth logic circuit for receiving the twelfth intermediate bit, a clock input terminal for receiving the system clock signal, and a reset input terminal for receiving the system reset signal, wherein the third flip-flop generates a second bit of the position binary value at an output terminal thereof. A fourth flip-flop is provided having an input terminal connected to the output terminal of the sixth logic circuit for receiving the thirteenth intermediate bit, a clock input terminal for receiving the system clock signal, and a reset input terminal for receiving the system reset signal. The fourth flip-flop generates a first bit of the position binary value at an output terminal thereof. A fifth flip-flop is provided having an input terminal connected to the output terminal of the second OR gate for receiving the fifteenth intermediate bit, a clock input terminal for receiving the system clock signal, and a reset input terminal for receiving the system reset signal. The fifth flip-flop generates the fourteenth intermediate bit at an output terminal thereof. A sixth flip-flop is provided having an input terminal connected to the output terminal of the third OR gate for receiving the seventeenth intermediate bit, a clock input terminal for receiving the system clock signal, and a reset input terminal for receiving the system reset signal, wherein the sixth flip-flop generates the sixteenth intermediate bit at an output terminal thereof. A seventh flip-flop is provided having an input terminal connected to the output terminal of the seventh logic circuit for receiving the nineteenth intermediate bit, a clock input terminal for receiving the system clock signal, and a reset input terminal for receiving the system reset signal. The seventh flip-flop generates the eighteenth and inverted eighteenth intermediate bits at first and second output terminals, thereof, respectively. An eighth flip-flop is provided having an input terminal connected to the output terminal of the eighth logic circuit for receiving the twenty-first intermediate bit, a clock input terminal for receiving the system clock signal, a reset input terminal for receiving the system reset signal. The seventh flip-flop generates the twentieth and inverted twentieth intermediate bits at first and second output terminals, thereof, respectively. A ninth flip-flop is provided having an input terminal connected to the output terminal of the ninth logic circuit for receiving the twenty-third intermediate bit, a clock input terminal for receiving the system clock signal, and a reset input terminal for receiving the system reset signal. The ninth flip-flop generates the twenty-second and inverted twenty-second intermediate bits at first and second output terminals, thereof, respectively. A tenth flip-flop is provided having an input terminal connected to the output terminal of the tenth logic circuit for receiving the twenty-fifth intermediate bit, a clock input terminal for receiving the system clock signal, and a reset input terminal for receiving the system reset signal. The tenth flip-flop generates the twenty-fourth and inverted twenty-fourth intermediate bits at first and second output terminals, thereof, respectively. An eleventh flip-flop is provided having an input terminal connected to the output terminal of the eleventh logic circuit for receiving the twenty-seventh intermediate bit, a clock input terminal for receiving the system clock signal, and a reset input terminal for receiving the system reset signal. The eleventh flip-flop generates the twenty-sixth and inverted twenty-sixth intermediate bits at first and second output terminals, thereof, respectively. A twelfth flip-flop is provided having an input terminal connected to the output terminal of the twelfth logic circuit for receiving the twenty-ninth intermediate bit, a clock input terminal for receiving the system clock signal, and a reset input terminal for receiving the system reset signal. The twelfth flip-flop generates the twenty-eighth and inverted twenty-eighth intermediate bits at first and second output terminals, thereof, respectively.

The multiplier circuit further includes a shifter circuit connected to the priority encoder for receiving the second binary value and the position binary value generated in a current iteration of the multiplier circuit, generating a first intermediate product by left-shifting the second binary value by a count equal to the position binary value, and generating a result acknowledgement signal when the multiplication of the first and second binary values is finished. The multiplier circuit further includes an accumulator connected to the shifter circuit for receiving and accumulating one or more intermediate products generated by the shifter circuit during one or more iterations of the multiplier circuit to generate a final product that is a product of the first and second binary values.

In yet another embodiment of the present invention, a multiplier circuit for multiplying first and second binary values is provided. The multiplier circuit includes a first logic circuit for receiving the first binary value and a multiplier modifier and resetting a set bit detected in a previous iteration of the multiplier circuit to generate a modified first binary value based on the multiplier modifier. The first logic circuit includes first through eighth NOT gates for receiving first through eighth bits of the first binary value, respectively, and generating inverted first through eighth bits, respectively. The first logic circuit further includes first through eighth NOR gates connected to the first through eighth NOT gates, respectively, for receiving the inverted first through eighth bits of the first binary value and first through eighth bits of the multiplier modifier, and generating first through eighth bits of the modified first binary value.

The multiplier circuit further includes a priority encoder connected to the first logic circuit for receiving the modified first binary value, detecting a most significant set bit in the modified first binary value, generating a position binary value that includes a position of the most significant set bit, and generating the multiplier modifier. The priority encoder includes a ninth NOT gate for receiving and inverting the first bit of the modified first binary value to generate the inverted first bit of the modified first binary value. Further, a first NAND gate is connected to the ninth NOT gate for receiving the inverted first bit and the second bit of the modified first binary value at first and second input terminals thereof, respectively, and generating a first intermediate bit at an output terminal thereof. A tenth NOT gate is connected to the output terminal of the first NAND gate for receiving the first intermediate bit and generating an inverted first intermediate bit. A first AND gate is connected to the tenth NOT gate for receiving the inverted first intermediate bit and the third bit of the modified first binary value and generating a second intermediate bit at an output terminal thereof. A ninth NOR gate is connected to the output terminal of the first AND gate and the ninth NOT gate for receiving the second intermediate bit and the inverted first bit of the modified first binary value and generating a third intermediate bit at an output terminal thereof. A tenth NOR gate is provided for receiving the fourth and fifth bits of the modified first binary value and generating a fourth intermediate bit at an output terminal thereof. Further, an eleventh NOT gate for receiving and inverting the sixth bit of the modified first binary value to generate an inverted sixth bit of the modified first binary value is provided. A twelfth NOT gate is provided for receiving and inverting the seventh bit of the modified first binary value to generate an inverted seventh bit of the modified first binary value. A second NAND gate is connected to the twelfth NOT gate for receiving the eighth and inverted seventh bits of the modified first binary value at first and second input terminals thereof, respectively, and generating a fifth intermediate bit at an output terminal thereof. A first OR gate is provided for receiving the first and second bits of the modified first binary value at first and second input terminals thereof, respectively, and generating a sixth intermediate bit at an output terminal thereof. A thirteenth NOT gate is provided for receiving and inverting the sixth intermediate bit to generate an inverted sixth intermediate bit. A fourteenth NOT gate is provided for receiving and inverting the fourth bit of the modified first binary value to generate an inverted fourth bit of the modified first binary value. A fifteenth NOT gate is provided for receiving and inverting the third bit of the modified first binary value to generate an inverted third bit of the modified first binary value. A third NAND gate is connected to the thirteenth through fifteenth NOT gates for receiving the inverted sixth intermediate bit, and inverted third and fourth bits of the modified first binary value at first through third input terminals thereof, respectively, and generating a seventh intermediate bit at an output terminal thereof. A sixteenth NOT gate is provided for receiving and inverting the seventh intermediate bit to generate an inverted seventh intermediate bit. A seventeenth NOT gate is provided for receiving and inverting the fifth bit of the modified first binary value to generate an inverted fifth bit of the modified first binary value. A fourth NAND gate is connected to the sixteenth, seventeenth, and eleventh NOT gates for receiving the inverted seventh intermediate and the inverted fifth and sixth bits of the modified first binary value at first through third input terminals thereof, respectively, and generating an eighth intermediate bit at an output terminal thereof. An eighteenth NOT gate is provided for receiving and inverting the eighth bit of the modified first binary value to generate an inverted eighth bit of the modified first binary value. A second logic circuit is connected to the tenth NOR gate for receiving the fourth intermediate bit and sixth and seventh bits of the modified first binary value and generating a ninth intermediate bit at an output terminal thereof. A third logic circuit is connected to the second NAND gate, and the eleventh and fourteenth NOT gates, for receiving the fifth intermediate bit, the fifth bit, and the inverted fourth and sixth bits of the modified first binary value and generating a tenth intermediate bit at an output terminal thereof. A nineteenth NOT gate is connected to the output terminal of the third logic circuit for receiving and inverting the tenth intermediate bit and generating an inverted tenth intermediate bit. A fourth logic circuit is connected to the ninth and tenth NOR gates for receiving the third and fourth intermediate bits, and first bit of the modified first binary value and generating an eleventh intermediate bit at an output terminal thereof. A fifth logic circuit is connected to the output terminal of the second logic circuit and the ninth NOR gate for receiving the third intermediate bit, the first bit of the modified first binary value, and the ninth intermediate bit and generating a twelfth intermediate bit at an output terminal thereof. A sixth logic circuit is connected to the nineteenth NOT gate and the first NAND gate for receiving the first and inverted tenth intermediate bits, and the first and third bits of the modified first binary value and generating a thirteenth intermediate bit at an output terminal thereof. A second OR gate is provided for receiving the first bit of the modified first binary value, a fourteenth intermediate bit, and generating a fifteenth intermediate bit at an output terminal thereof. A third OR gate is connected to the tenth NOT gate for receiving the inverted first intermediate bit and a sixteenth intermediate bit and generating a seventeenth intermediate bit at an output terminal thereof. A seventh logic circuit is connected to the first OR gate and the fifteenth NOT gate for receiving the sixth intermediate bit, the inverted third bit of the modified first binary value, and an inverted eighteenth intermediate bit and generating a nineteenth intermediate bit at an output terminal thereof. An eighth logic circuit is connected to the first OR gate and the fourteenth NOT gate for receiving the sixth intermediate bit, the third bit and inverted fourth bit of the modified first binary value, and a inverted twentieth intermediate bit and generating a twenty-first intermediate bit at an output terminal thereof. A ninth logic circuit is connected to the output terminal of the third NAND gate, the seventeenth NOT gate for receiving the inverted fifth bit of the modified first binary value, the seventh intermediate bit, and a inverted twenty-second intermediate bit and generating a twenty-third intermediate bit at an output terminal thereof. A tenth logic circuit is connected to the eleventh NOT gate and the third NAND gate for receiving the seventh intermediate bit, the fifth and inverted sixth bits of the modified first binary value, and a inverted twenty-fourth intermediate bit and generating a twenty-fifth intermediate bit at an output terminal thereof. An eleventh logic circuit is connected to the twelfth NOT gate and the fourth NAND gate for receiving the inverted seventh bit of the modified first binary value, the eighth intermediate bit, and a inverted twenty-sixth intermediate bit and generating a twenty-seventh intermediate bit at an output terminal thereof. A twelfth logic circuit is connected to the eighteenth NOT gate and the fourth NAND gate for receiving the eighth intermediate bit, the seventh and inverted eighth bits of the modified first binary value, and a inverted twenty-eighth intermediate bit and generating a twenty-ninth intermediate bit at an output terminal thereof. The priority encoder further includes a first flip-flop having an input terminal for receiving the first bit of the modified first binary value, a clock input terminal for receiving a system clock signal, and a reset input terminal for receiving a system reset signal. The first flip-flop generates a fourth bit of the position binary value at an output terminal thereof. A second flip-flop is provided having an input terminal connected to the output terminal of the fourth logic circuit for receiving the eleventh intermediate bit, a clock input terminal for receiving the system clock signal, and a reset input terminal for receiving the system reset signal. The second flip-flop generates a third bit of the position binary value at an output terminal thereof. A third flip-flop is provided having an input terminal connected to the output terminal of the fifth logic circuit for receiving the twelfth intermediate bit, a clock input terminal for receiving the system clock signal, and a reset input terminal for receiving the system reset signal, wherein the third flip-flop generates a second bit of the position binary value at an output terminal thereof. A fourth flip-flop is provided having an input terminal connected to the output terminal of the sixth logic circuit for receiving the thirteenth intermediate bit, a clock input terminal for receiving the system clock signal, and a reset input terminal for receiving the system reset signal. The fourth flip-flop generates a first bit of the position binary value at an output terminal thereof. A fifth flip-flop is provided having an input terminal connected to the output terminal of the second OR gate for receiving the fifteenth intermediate bit, a clock input terminal for receiving the system clock signal, and a reset input terminal for receiving the system reset signal. The fifth flip-flop generates the fourteenth intermediate bit at an output terminal thereof. A sixth flip-flop is provided having an input terminal connected to the output terminal of the third OR gate for receiving the seventeenth intermediate bit, a clock input terminal for receiving the system clock signal, and a reset input terminal for receiving the system reset signal, wherein the sixth flip-flop generates the sixteenth intermediate bit at an output terminal thereof. A seventh flip-flop is provided having an input terminal connected to the output terminal of the seventh logic circuit for receiving the nineteenth intermediate bit, a clock input terminal for receiving the system clock signal, and a reset input terminal for receiving the system reset signal. The seventh flip-flop generates the eighteenth and inverted eighteenth intermediate bits at first and second output terminals, thereof, respectively. An eighth flip-flop is provided having an input terminal connected to the output terminal of the eighth logic circuit for receiving the twenty-first intermediate bit, a clock input terminal for receiving the system clock signal, a reset input terminal for receiving the system reset signal. The seventh flip-flop generates the twentieth and inverted twentieth intermediate bits at first and second output terminals, thereof, respectively. A ninth flip-flop is provided having an input terminal connected to the output terminal of the ninth logic circuit for receiving the twenty-third intermediate bit, a clock input terminal for receiving the system clock signal, and a reset input terminal for receiving the system reset signal. The ninth flip-flop generates the twenty-second and inverted twenty-second intermediate bits at first and second output terminals, thereof, respectively. A tenth flip-flop is provided having an input terminal connected to the output terminal of the tenth logic circuit for receiving the twenty-fifth intermediate bit, a clock input terminal for receiving the system clock signal, and a reset input terminal for receiving the system reset signal. The tenth flip-flop generates the twenty-fourth and inverted twenty-fourth intermediate bits at first and second output terminals, thereof, respectively. An eleventh flip-flop is provided having an input terminal connected to the output terminal of the eleventh logic circuit for receiving the twenty-seventh intermediate bit, a clock input terminal for receiving the system clock signal, and a reset input terminal for receiving the system reset signal. The eleventh flip-flop generates the twenty-sixth and inverted twenty-sixth intermediate bits at first and second output terminals, thereof, respectively. A twelfth flip-flop is provided having an input terminal connected to the output terminal of the twelfth logic circuit for receiving the twenty-ninth intermediate bit, a clock input terminal for receiving the system clock signal, and a reset input terminal for receiving the system reset signal. The twelfth flip-flop generates the twenty-eighth and inverted twenty-eighth intermediate bits at first and second output terminals, thereof, respectively.

The multiplier circuit further includes a shifter circuit connected to the priority encoder for receiving the second binary value and the position binary value generated in a current iteration of the multiplier circuit, generating a first intermediate product by left-shifting the second binary value by a count equal to the position binary value, and generating a result acknowledgement signal when the multiplication of the first and second binary values is finished. The shifter circuit includes an eleventh NOR gate for receiving the first through fourth bits of the position binary value and generating an input selection signal a first mux having a first input terminal that receives an input signal, a second input terminal that receives the result acknowledgement signal, and a select input terminal connected to the eleventh NOR gate for receiving the input selection signal. The first mux selectively provides at least one of the first input and result acknowledgement signals at an output terminal thereof. A twentieth NOT gate is provided that receives the system reset signal and generates an inverted system reset signal. A thirteenth flip-flop is provided having an input terminal connected to the output terminal of the first mux for receiving the at least one of the input and result acknowledgement signals, a clock input terminal that receives the system clock signal, and a reset input terminal connected to the twentieth NOT gate for receiving the inverted system reset signal. The thirteenth flip-flop generates the result acknowledgement and inverted result acknowledgement signals at first and second output terminals, thereof, respectively. The first output terminal is connected to the first input terminal of the first mux for transmitting the result acknowledgement signal thereto. The shifter circuit further includes a barrel shifter circuit for receiving the second binary value and the first through fourth bits of the position binary value and left-shifting the second binary value by the count equal to the position binary value to generate the first intermediate product.

The multiplier circuit further includes an accumulator connected to the shifter circuit for receiving and accumulating one or more intermediate products generated by the shifter circuit during one or more iterations of the multiplier circuit to generate a final product that is a product of the first and second binary values.

Various embodiments of the present invention provide a multiplier circuit for multiplying first and second binary values. The multiplier circuit includes a first logic circuit that receives the first binary value and a multiplier modifier. The first logic circuit resets a set bit detected in a previous iteration of the multiplier circuit, based on the multiplier modifier, to generate a modified first binary value. The multiplier circuit further includes a priority encoder that is connected to the first logic circuit for receiving the modified first binary value. The priority encoder detects a most significant set bit in the modified first binary value and generates the multiplier modifier. The multiplier circuit further includes a shifter circuit that is connected to the priority encoder. The priority encoder transmits a position of the most significant set bit to the shifter circuit. The shifter circuit also receives the second binary value and left-shifts the second binary value by a count equal to the position of the most significant set bit detected in a current iteration of the multiplier circuit and generates an intermediate result. The multiplier circuit also includes an accumulator connected to the shifter circuit for receiving and accumulating the intermediate result to generate a final product that is a product of the first and second binary values. The multiplier circuit performs left-shift operation on the second binary value and addition of a left-shifted second binary value to a previous intermediate result only for the bits in the first binary value that are set to binary one. Left-shifting the second binary value and addition of the left-shifted second binary value to the previous intermediate result only for the set bits of the first binary value reduces a count of iterations required for generating the final product. This in turn reduces a count of clock cycles required for generating the final product, thereby reducing overall processing time of the multiplier circuit. The multiplier circuit of the present invention can be successfully used to implement Booth's multiplication.

Referring now to FIG. 1, a schematic block diagram depicting a multiplier circuit 100 in accordance with an embodiment of the present invention, is shown. The multiplier circuit 100 includes a first logic circuit 102, a priority encoder 104, a shifter circuit 106, and an accumulator 108. The first logic circuit 102 includes first through eighth NOT gates 110-124 and first through eighth NOR gates 126-140.

The first logic circuit 102 receives a first binary value (Data Input A) and a multiplier modifier. In an example, the first binary value is 8 bits long. The first logic circuit 102 resets a set bit detected in a previous iteration of the multiplier circuit 100 to generate a modified first binary value based on the multiplier modifier. The first through eighth NOT gates 110-124 receive first through eighth bits of the first binary value, respectively, and generate inverted first through eighth bits of the first binary value, respectively. The inverted first through eighth bits of the first binary value are transmitted to the first through eighth NOR gates 126-140. The first through eighth NOR gates 126-140 also receive first through eighth bits of the multiplier modifier and generate first through eighth bits of the modified first binary value.

The priority encoder 104 receives the modified first binary value and detects a most significant bit in the modified first binary value that is set to binary one. The priority encoder 104 then generates a position binary value that includes a position of the most significant set bit and generates the corresponding multiplier modifier that is used by the first logic circuit 102 to reset the set bit detected by the priority encoder 104. The priority encoder 104 resets the set bit already detected to avoid its detection in subsequent iterations of the multiplier circuit 100. The operation of the priority encoder 104 is explained in detail in conjunction with FIG. 2.

The shifter circuit 106 receives a second binary value (Data Input B) and the position binary value generated in a current iteration of the multiplier circuit 100 by the priority encoder 104 and generates a first intermediate product by left-shifting the second binary value by a count equal to the position binary value. The shifter circuit 106 generates a result acknowledgement signal when the multiplication of the first and second binary values is finished. The operation of the shifter circuit 106 is explained in detail in conjunction with FIG. 4.

The accumulator 108 receives and accumulates one or more intermediate products generated by the shifter circuit 106 during one or more iterations of the multiplier circuit 100, to generate a final product that is a product of the first and second binary values. The accumulator 108 is implemented in a manner known to those of skill in the art. In an embodiment of the present invention, the multiplier circuit 100 is used in a calculation device, viz., a calculator.

Figure 2:
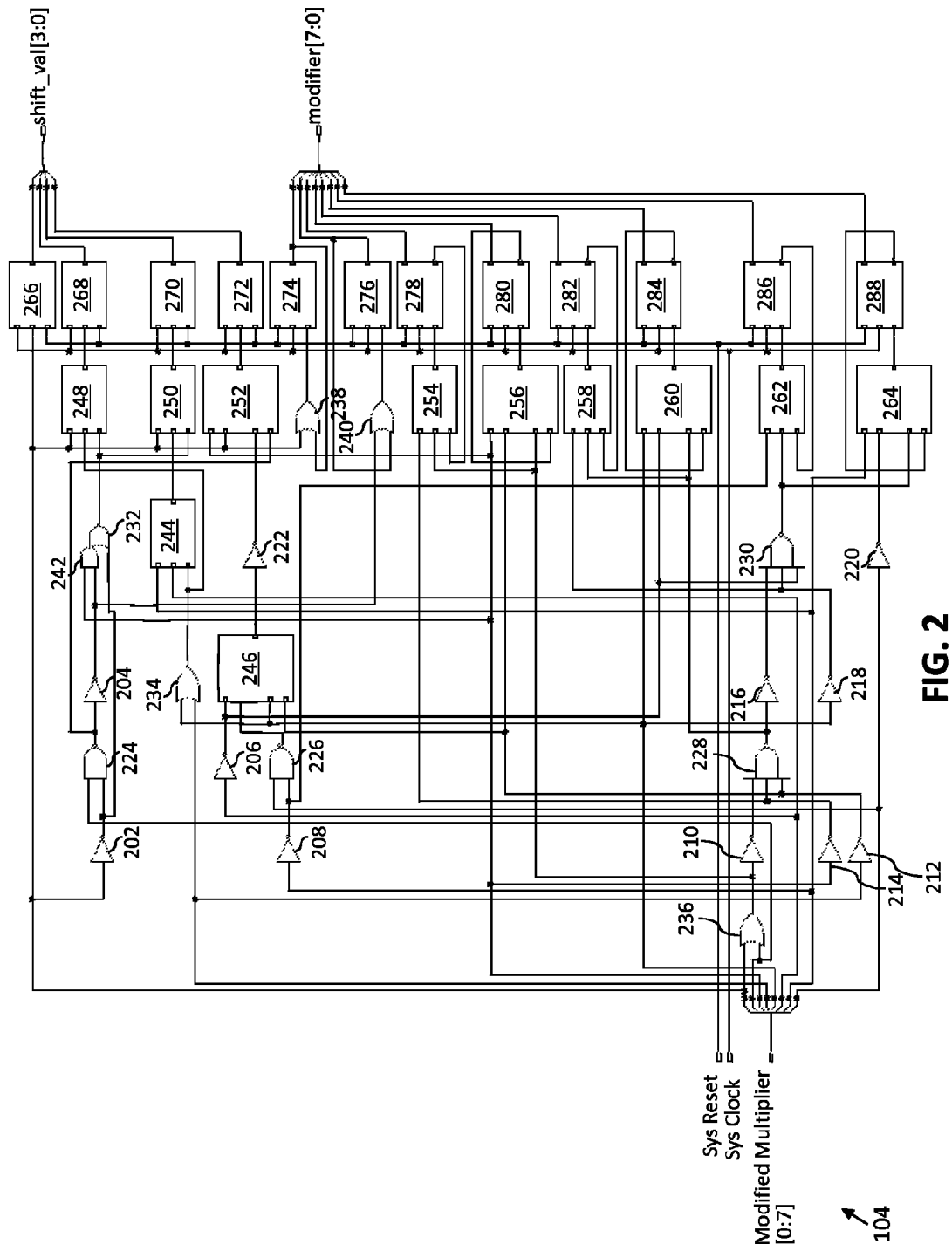
FIG. 2 is a schematic block diagram of a priority encoder in accordance with an embodiment of the present invention.

Referring now to FIG. 2, a schematic block diagram of the priority encoder 104 in accordance with an embodiment of the present invention, is shown. The priority encoder 104 includes ninth through eighteenth NOT gates 202-222, first through fourth NAND gates 224-230, ninth and tenth NOR gates 232 and 234, first through third OR gates 236-240, a first AND gate 242, second through twelfth logic circuits 244-264, and first through twelfth flip-flops 266-288.

The ninth NOT gate 202 receives and inverts a first bit of the modified first binary value to generate an inverted first bit of the modified first binary value. The first NAND gate 224 that is connected to the ninth NOT gate 202 receives the inverted first bit and a second bit of the modified first binary value at first and second input terminals thereof, respectively. The first NAND gate 224 generates a first intermediate bit at an output terminal thereof. The tenth NOT gate 204 that is connected to the output terminal of the first NAND gate 224 receives the first intermediate bit and generates an inverted first intermediate bit. The first AND gate 242 that is connected to the tenth NOT gate 204 for receiving the inverted first intermediate bit and the third bit of the modified first binary value. The first AND gate 242 generates a second intermediate bit at an output terminal thereof based on the inverted first intermediate bit and the third bit of the modified first binary value. The ninth NOR gate 232 that is connected to the output terminal of the first AND gate 242 and the ninth NOT gate 202 receives the second intermediate bit and the inverted first bit of the modified first binary value. The ninth NOR gate 232 generates a third intermediate bit at an output terminal thereof based on the second intermediate bit and the inverted first bit of the modified first binary value. The tenth NOR gate 234 receives the fourth and fifth bits of the modified first binary value and generates a fourth intermediate bit at an output terminal thereof. The eleventh NOT gate 206 receives and inverts the sixth bit of the modified first binary value to generate an inverted sixth bit of the modified first binary value. The twelfth NOT gate 208 receives and inverts the seventh bit of the modified first binary value to generate an inverted seventh bit of the modified first binary value. The second NAND gate 226 that is connected to the twelfth NOT gate 208 receives the eighth and inverted seventh bits of the modified first binary value at first and second input terminals thereof, respectively, and generates a fifth intermediate bit at an output terminal thereof. The first OR gate 236 having an output terminal connected to the thirteenth NOT gate receives the first and second bits of the modified first binary value at first and second input terminals thereof, respectively, and generates a sixth intermediate bit at the output terminal thereof. The thirteenth NOT gate 210 that is connected to the output terminal of the first OR gate 236 receives and inverts the sixth intermediate bit to generate an inverted sixth intermediate bit.

Further, the fourteenth NOT gate 212 receives and inverts the fourth bit of the modified first binary value to generate an inverted fourth bit of the modified first binary value. The fifteenth NOT gate 214 receives and inverts the third bit of the modified first binary value to generate an inverted third bit of the modified first binary value. The third NAND gate 228 that is connected to the thirteenth through fifteenth NOT gates 210-214 receives the inverted sixth intermediate bit, and inverted third and fourth bits of the modified first binary value at first through third input terminals thereof, respectively. The third NAND gate 228 generates a seventh intermediate bit at an output terminal thereof. The sixteenth NOT gate 216 that is connected to the output terminal of the third NAND gate 228 receives and inverts the seventh intermediate bit to generate an inverted seventh intermediate bit. The seventeenth NOT gate 218 receives and inverts the fifth bit of the modified first binary value to generate an inverted fifth bit of the modified first binary value. The fourth NAND gate 230 that is connected to the eleventh, sixteenth, and seventeenth NOT gates 206, 216 and 218, respectively, receives the inverted seventh intermediate bit and the inverted fifth and sixth bits of the modified first binary value at first through third input terminals thereof, respectively. The fourth NAND gate 230 generates an eighth intermediate bit at an output terminal thereof. The eighteenth NOT gate 220 receives and inverts the eighth bit of the modified first binary value to generate an inverted eighth bit of the modified first binary value. The second logic circuit 244 that is connected to the tenth NOR gate 234 receives the sixth and seventh bits of the modified first binary value, and the fourth intermediate bit at first, second, and third input terminals, respectively. The second logic circuit 244 generates a ninth intermediate bit at an output terminal thereof.

The third logic circuit 246 that is connected to the second NAND gate 226, and the eleventh and fourteenth NOT gates 206 and 212 receives the inverted sixth bit of the modified first binary value, the fifth intermediate bit, the fifth bit of the modified first binary value, and the inverted fourth bit of the modified first binary value at first through fourth input terminals thereof. The third logic circuit 246 generates a tenth intermediate bit at an output terminal thereof. The third logic circuit 246 generates the tenth intermediate bit by performing AND logic operation on the inverted fifth bit and the sixth bit of the modified first binary value to generate a first intermediate logic result and performing AND logic operation on the inverted fifth intermediate bit and the inverted fifth bit of the modified first binary value to generate a second intermediate logic result. Thereafter, OR logic operation is performed on the first and second logic results and the fourth bit of the modified first binary value to generate the tenth intermediate bit. The third logic circuit 246 is explained in detail in conjunction with FIG. 3C. The nineteenth NOT gate 222 that is connected to the output terminal of the third logic circuit 246 receives and inverts the tenth intermediate bit to generate an inverted tenth intermediate bit. The fourth logic circuit 248 that is connected to the ninth and tenth NOR gates 232-234 receives the first bit of the modified first binary value, and the fourth and third intermediate bits at first through third input terminals thereof, respectively. The fourth logic circuit 248 generates an eleventh intermediate bit at an output terminal thereof. The fifth logic circuit 250 that is connected to the output terminal of the second logic circuit 244 and the ninth NOR gate 232 for receiving the first bit of the modified first binary value, the ninth and third intermediate bits at first through third input terminals thereof, respectively. The fifth logic circuit 250 generates a twelfth intermediate bit at an output terminal thereof. The sixth logic circuit 252 that is connected to the nineteenth NOT gate 222 and the first NAND gate 224 receives the third and first bits of the modified first binary value, the inverted tenth intermediate bit, and the first intermediate bit at first through fourth input terminals thereof, respectively. The sixth logic circuit 252 generates a thirteenth intermediate bit at an output terminal thereof. The second OR gate 238 that is connected to an output terminal of the fifth flip-flop 274 receives the first bit of the modified first binary value and a fourteenth intermediate bit, and generates a fifteenth intermediate bit at an output terminal thereof. The third OR gate 240 that is connected to the tenth NOT gate 204 receives the inverted first intermediate bit and a sixteenth intermediate bit and generates a seventeenth intermediate bit at an output terminal thereof. The seventh logic circuit 254 that is connected to the first OR gate 236 and the fifteenth NOT gate 214 receives the inverted third bit of the modified first binary value, the sixth intermediate bit, and an inverted eighteenth intermediate bit at first through third input terminals thereof, respectively. The seventh logic circuit 254 generates a nineteenth intermediate bit at an output terminal thereof.

The eighth logic circuit 256 that is connected to the first OR gate 236 and the fourteenth NOT gate 212 receives the third and inverted fourth bits of the modified first binary value, the sixth intermediate bit, and an inverted twentieth intermediate bit at first through fourth input terminals thereof, respectively. The eighth logic circuit 256 generates a twenty-first intermediate bit at an output terminal thereof. The ninth logic circuit 258 that is connected to the output terminal of the third NAND gate 228 and the seventeenth NOT gate 218 receives the inverted fifth bit of the modified first binary value, the seventh intermediate bit, and an inverted twenty-second intermediate bit at first through third input terminals thereof, respectively. The ninth logic circuit 258 generates a twenty-third intermediate bit at an output terminal thereof. The tenth logic circuit 260 that is connected to the eleventh NOT gate 206 and the third NAND gate 228 receives the fifth and inverted sixth bits of the modified first binary value, the seventh intermediate bit, and an inverted twenty-fourth intermediate bit at first through fourth input terminals thereof, respectively. The tenth logic circuit 260 generates a twenty-fifth intermediate bit at an output terminal thereof.

The eleventh logic circuit 262 that is connected to the twelfth NOT gate 208 and the fourth NAND gate 230 receives the inverted seventh bit of the modified first binary value, the eighth intermediate bit, and an inverted twenty-sixth intermediate bit at first through third input terminals thereof, respectively. The eleventh logic circuit 262 generates a twenty-seventh intermediate bit at an output terminal thereof. The twelfth logic circuit 264 that is connected to the eighteenth NOT gate 220 and the fourth NAND gate 230 receives the seventh and inverted eighth bits of the modified first binary value, the eighth intermediate bit, and an inverted twenty-eighth intermediate bit at first through fourth input terminals thereof, respectively. The twelfth logic circuit 264 generates a twenty-ninth intermediate bit at an output terminal thereof.

The first flip-flop 266 receives the first bit of the modified first binary value at an input terminal thereof. A system clock signal is provided at a clock input terminal of the first flip-flop 266 and a system reset signal is provided at a reset input terminal of the first flip-flop 266. The first flip-flop 266 generates a fourth bit of the position binary value at an output terminal thereof based on the first bit of the modified first binary value and the system clock signal.

The output terminal of the fourth logic circuit 248 is connected to an input terminal of the second flip-flop 268 for transmitting the eleventh intermediate bit thereto. A system clock signal is provided at a clock input terminal of the second flip-flop 268 and a system reset signal is provided at a reset input terminal of the first flip-flop 268. The second flip-flop 268 generates a third bit of the position binary value at an output terminal thereof based on the eleventh intermediate bit and the system clock signal.

The output terminal of the fifth logic circuit 250 is connected to an input terminal of the third flip-flop 270 for transmitting the twelfth intermediate bit thereto. A system clock signal is provided at a clock input terminal of the third flip-flop 270 and a system reset signal is provided at a reset input terminal of the first flip-flop 270. The third flip-flop 270 generates a second bit of the position binary value at an output terminal thereof based on the twelfth intermediate bit and the system clock signal.

The output terminal of the sixth logic circuit 252 is connected to an input terminal of the fourth flip-flop 272 for transmitting the thirteenth intermediate bit thereto. A system clock signal is provided at a clock input terminal of the fourth flip-flop 272 and a system reset signal is provided at a reset input terminal of the fourth flip-flop 272. The fourth flip-flop 272 generates a first bit of the position binary value at an output terminal thereof based on the thirteenth intermediate bit and the system clock signal.

The output terminal of the second OR gate 238 is connected to an input terminal of the fifth flip-flop 274 for transmitting the fifteenth intermediate bit thereto. A system clock signal is provided at a clock input terminal of the fifth flip-flop 274 and a system reset signal is provided at a reset input terminal of the fifth flip-flop 274. The fifth flip-flop 274 generates the fourteenth intermediate bit at the output terminal thereof based on the fifteenth intermediate bit and the system clock signal. The fourteenth intermediate bit is an eighth bit of the multiplier modifier.

The output terminal of the third OR gate 240 is connected to an input terminal of the sixth flip-flop 276 for transmitting the seventeenth intermediate bit thereto. A system clock signal is provided at a clock input terminal of the sixth flip-flop 276 and a system reset signal is provided at a reset input terminal of the sixth flip-flop 276. The sixth flip-flop 276 generates the sixteenth intermediate bit at an output terminal thereof based on the seventeenth intermediate bit and the system clock signal. The sixteenth intermediate bit is a seventh bit of the multiplier modifier.

The output terminal of the seventh logic circuit 254 is connected to an input terminal of the seventh flip-flop 278 for transmitting the nineteenth intermediate bit thereto. A system clock signal is provided at a clock input terminal of the seventh flip-flop 278 and a system reset signal is provided at a reset input terminal of the seventh flip-flop 278. The seventh flip-flop 278 generates the eighteenth intermediate bit and an inverted eighteenth intermediate bit at first and second output terminals thereof based on the nineteenth intermediate bit and the system clock signal. The eighteenth intermediate bit is a sixth bit of the multiplier modifier.

The output terminal of the eighth logic circuit 256 is connected to an input terminal of the eighth flip-flop 280 for transmitting the twenty-first intermediate bit thereto. A system clock signal is provided at a clock input terminal of the eighth flip-flop 280 and a system reset signal is provided at a reset input terminal of the eighth flip-flop 280. The eighth flip-flop 280 generates the twentieth intermediate bit and an inverted twentieth intermediate bit at first and second output terminals thereof based on the twenty-first intermediate bit and the system clock signal. The twentieth intermediate bit is a fifth bit of the multiplier modifier.

The output terminal of the ninth logic circuit 258 is connected to an input terminal of the ninth flip-flop 282 for transmitting the twenty-third intermediate bit thereto. A system clock signal is provided at a clock input terminal of the ninth flip-flop 282 and a system reset signal is provided at a reset input terminal of the ninth flip-flop 282. The ninth flip-flop 282 generates the twenty-second intermediate bit and an inverted twenty-second intermediate bit at first and second output terminals thereof based on the twenty-third intermediate bit and the system clock signal. The twenty-second intermediate bit is a fourth bit of the multiplier modifier.

The output terminal of the tenth logic circuit 260 is connected to an input terminal of the tenth flip-flop 284 for transmitting the twenty-fifth intermediate bit thereto. A system clock signal is provided at a clock input terminal of the tenth flip-flop 284 and a system reset signal is provided at a reset input terminal of the tenth flip-flop 284. The tenth flip-flop 284 generates the twenty-fourth intermediate bit and an inverted twenty-fourth intermediate bit at first and second output terminals thereof based on the twenty-fifth intermediate bit and the system clock signal. The twenty-fourth intermediate bit is a third bit of the multiplier modifier.

The output terminal of the eleventh logic circuit 262 is connected to an input terminal of the eleventh flip-flop 286 for transmitting the twenty-seventh intermediate bit thereto. A system clock signal is provided at a clock input terminal of the eleventh flip-flop 286 and a system reset signal is provided at a reset input terminal of the eleventh flip-flop 286. The eleventh flip-flop 286 generates the twenty-sixth intermediate bit and an inverted twenty-sixth intermediate bit at first and second output terminals thereof based on the twenty-seventh intermediate bit and the system clock signal. The twenty-sixth intermediate bit is a second bit of the multiplier modifier.

The output terminal of the twelfth logic circuit 264 is connected to an input terminal of the twelfth flip-flop 288 for transmitting the twenty-ninth intermediate bit thereto. A system clock signal is provided at a clock input terminal of the twelfth flip-flop 288 and a system reset signal is provided at a reset input terminal of the twelfth flip-flop 288. The twelfth flip-flop 288 generates the twenty-eighth intermediate bit and an inverted twenty-eighth intermediate bit at first and second output terminals thereof based on the twenty-ninth intermediate bit and the system clock signal. The twenty-eighth intermediate bit is a first bit of the multiplier modifier.

In an embodiment of the present invention, the second, fourth, fifth, seventh, ninth, and eleventh logic circuits 244, 248, 250, 254, 258, and 262 invert input signals provided at their respective first and second input terminals to generate inverted first and second input signals. An AND logic operation is then performed on the inverted first and second input signals to generate a third intermediate logic result. Subsequently OR logic operation is performed on the third intermediate logic result and on an inverted input signal provided at a third input terminal to generate an output signal. The second logic circuit 244 is explained in detail in conjunction with FIG. 3A. The fourth, fifth, seventh, ninth, and eleventh logic circuits 248, 250, 254, 258, and 262 have an operation identical to that of the second logic circuit 244.

In an embodiment of the present invention, the sixth, eighth, tenth, and twelfth logic circuits 252, 256, 260, 264 invert input signals provided at their respective first through third input terminals to generate inverted first through third input signals. An AND logic operation is performed on the inverted first through third input signals to generate a fourth intermediate logic result. Subsequently OR logic operation is performed on the fourth intermediate logic result and on an inverted input signal provided at a fourth input terminal to generate an output signal. The sixth logic circuit 252 is explained in detail in conjunction with FIG. 3B. The eighth, tenth, and twelfth logic circuits 256, 260, and 264 have an operation identical to that of the sixth logic circuit 252.

Referring now to FIG. 3A a schematic block diagram of the second logic circuit 244 in accordance with an embodiment of the present invention, is shown. The second logic circuit 244 includes a second AND gate 302, and a fourth OR gate 304. The second AND gate 302 receives inverted sixth and seventh bits of the modified first binary value at the first and second input terminals (A and B) thereof, respectively and performs AND logic operation to generate the third intermediate result that is transmitted to a first input terminal (D) of the fourth OR gate 304. An inverted fourth intermediate bit is transmitted to a second input terminal (C) of the fourth OR gate 304. The fourth OR gate 304 performs OR logic operation on the third intermediate result and the inverted fourth intermediate bit to generate the ninth intermediate bit at the output terminal thereof.

Referring now to FIG. 3B, schematic block diagram of the sixth logic circuit 252 in accordance with an embodiment of the present invention, is shown. The sixth logic circuit 252 includes a third AND gate 306, and a fifth OR gate 308. The third AND gate 306 receives inverted third and first bits of the modified first binary value and the tenth intermediate bit at the first through third input terminals (A, B, and C) thereof, respectively and performs AND logic operation to generate the fourth intermediate result that is transmitted to a first input terminal (E) of the fifth OR gate 308. An inverted first intermediate bit is transmitted to a second input terminal (D) of the fifth OR gate 308. The fifth OR gate 308 performs OR logic operation on the fourth intermediate result and the first intermediate bit to generate the thirteenth intermediate bit at the output terminal thereof.

Referring now to FIG. 3C, a schematic block diagram of the third logic circuit 246 in accordance with an embodiment of the present invention, is shown. The third logic circuit 246 includes fourth and fifth AND gates 310 and 312, and a sixth OR gate 314. The fourth AND gate 310 receives the sixth bit of the modified first binary value and an inverted fifth bit of the modified first binary value at first and second input terminals (A and C) thereof, respectively and performs AND logic operation to generate the first intermediate logic result. The fifth AND gate 312 receives an inverted fifth intermediate bit and an inverted fifth bit of the modified first binary value at first and second input terminals (B and D) thereof, respectively and performs AND logic operation to generate the second intermediate logic result. The first and second intermediate results, and the fourth bit of the modified first binary value are transmitted to first through third input terminals (E, F, and G) thereof, respectively of the sixth OR gate 314, respectively. The sixth OR gate 314 performs OR logic operation to generate the tenth intermediate result at an output terminal thereof.

Figure 4:
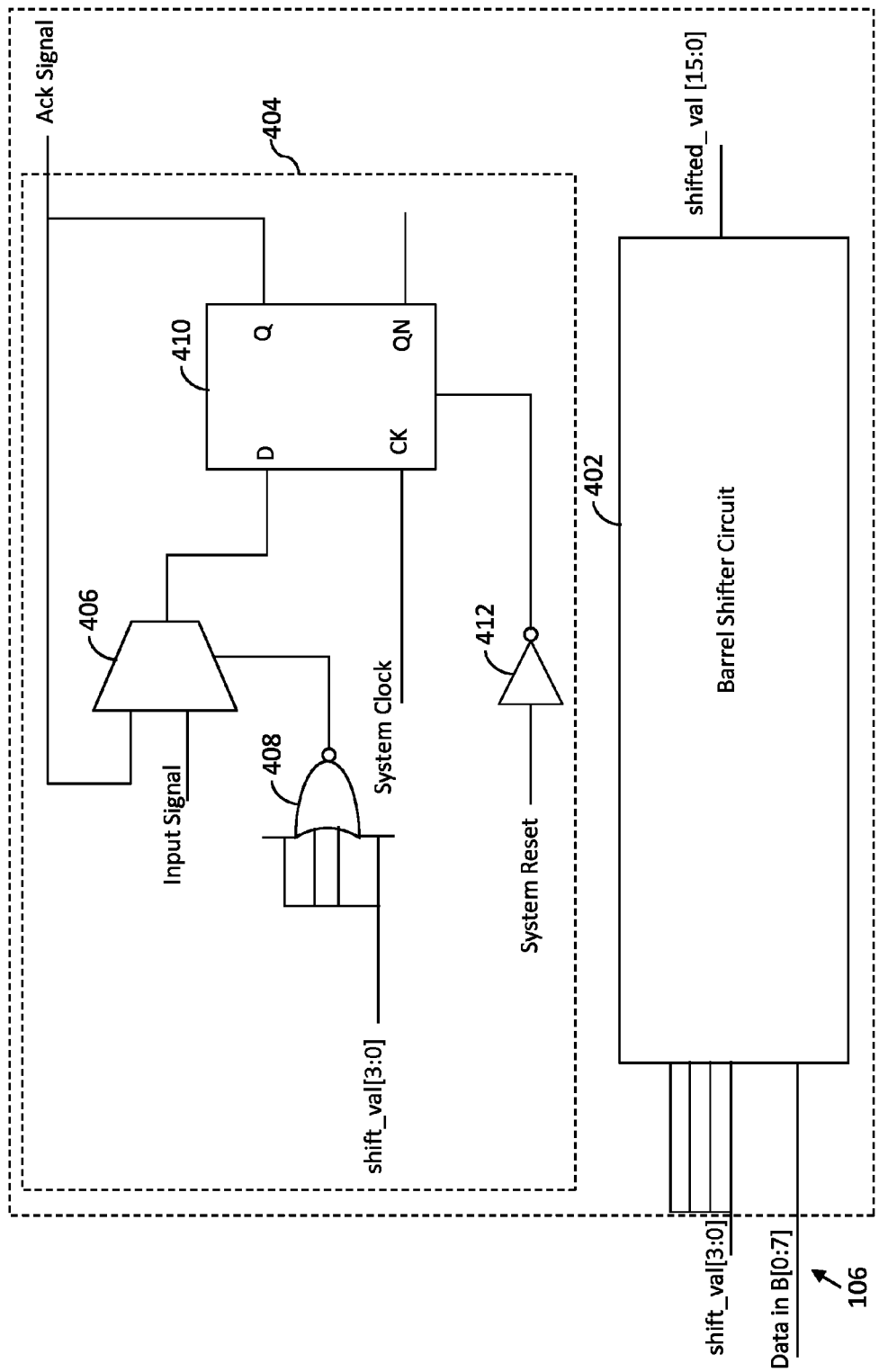
FIG. 4 is a schematic block diagram of a shifter circuit in accordance with an embodiment of the present invention.

Referring now to FIG. 4, a schematic block diagram of the shifter circuit 106 in accordance with an embodiment of the present invention, is shown. The shifter circuit 106 includes a barrel shifter 402 and a thirteenth logic circuit 404. The thirteenth logic circuit 404 includes a mux 406, an eleventh NOR gate 408, a thirteenth flip-flop 410, and twentieth NOT gate 412.

The eleventh NOR gate 408 that is connected to a select input terminal of the mux 406 receives the first through fourth bits of the position binary value and generates an input selection signal. The eleventh NOR gate 408 transmits the input selection signal to the mux 406.

The mux 406 having an output terminal thereof connected to an input terminal of the thirteenth flip-flop 410 receives an input signal, that is equal to binary one, at a first input terminal, the result acknowledgement signal at a second input terminal, and the input selection signal at the select input terminal. The mux 406 selectively provides at least one of the first input and result acknowledgement signals at the output terminal thereof based on the input selection signal.

The twentieth NOT gate 412 that is connected to a reset input terminal of the thirteenth flip-flop 410 receives the system reset signal, and generates and transmits an inverted system reset signal to the thirteenth flip-flop 410. The thirteenth flip-flop 410 receives at least one of the input and result acknowledgement signals at the input terminal thereof, the system clock signal at a clock input terminal thereof, and the inverted system reset signal at the reset input terminal. The thirteenth flip-flop 410 generates the result acknowledgement and inverted result acknowledgement signals at first and second output terminals, thereof, respectively. The first output terminal of the thirteenth flip-flop 410 is connected to the first input terminal of the mux 406 for transmitting the result acknowledgement signal thereto. The result acknowledgement signal indicates generation of the final product that is the product of the first and second binary values.

The barrel shifter circuit 402 receives the second binary value and the first through fourth bits of the position binary value. The barrel shifter circuit 402 left-shifts the second binary value by the count equal to the position binary value to generate the first intermediate product. The barrel shifter circuit 402 is implemented in a manner known to those of skill in the art. The barrel shifter circuit 402 transmits the first intermediate product to the accumulator 108 (refer FIG. 1).

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A multiplier circuit for multiplying first and second binary values, comprising:
  a first logic circuit for receiving the first binary value and a multiplier modifier and resetting a set bit detected in a previous iteration of the multiplier circuit to generate a modified first binary value based on the multiplier modifier, wherein the first logic circuit comprises:
   first through eighth NOT gates for receiving first through eighth bits of the first binary value, respectively, and generating inverted first through eighth bits, respectively; and
   first through eighth NOR gates connected to the first through eighth NOT gates, respectively, for receiving the inverted first through eighth bits of the first binary value and first through eighth bits of the multiplier modifier, and generating first through eighth bits of the modified first binary value;
  a priority encoder connected to the first logic circuit for receiving the modified first binary value, detecting a most significant set bit in the modified first binary value, generating a position binary value that includes a position of the most significant set bit, and generating the multiplier modifier, wherein the priority encoder comprises:
   a ninth NOT gate (202) for receiving and inverting the first bit of the modified first binary value to generate the inverted first bit of the modified first binary value;
   a first NAND gate (224) connected to the ninth NOT gate for receiving the inverted first bit and the second bit of the modified first binary value at first and second input terminals thereof, respectively, and generating a first intermediate bit at an output terminal thereof;
   a tenth NOT gate (204) connected to the output terminal of the first NAND gate for receiving the first intermediate bit and generating an inverted first intermediate bit;
   a first AND gate (242) connected to the tenth NOT gate for receiving the inverted first intermediate bit and the third bit of the modified first binary value and generating a second intermediate bit at an output terminal thereof;
   a ninth NOR gate (232) connected to the output terminal of the first AND gate and the ninth NOT gate for receiving the second intermediate bit and the inverted first bit of the modified first binary value and generating a third intermediate bit at an output terminal thereof;
   a tenth NOR gate (234) for receiving the fourth and fifth bits of the modified first binary value and generating a fourth intermediate bit at an output terminal thereof;
   an eleventh NOT gate (206) for receiving and inverting the sixth bit of the modified first binary value to generate an inverted sixth bit of the modified first binary value;
   a twelfth NOT gate (208) for receiving and inverting the seventh bit of the modified first binary value to generate an inverted seventh bit of the modified first binary value;
   a second NAND gate (226) connected to the twelfth NOT gate for receiving the eighth and inverted seventh bits of the modified first binary value at first and second input terminals thereof, respectively, and generating a fifth intermediate bit at an output terminal thereof;
   a first OR gate (236) for receiving the first and second bits of the modified first binary value at first and second input terminals thereof, respectively, and generating a sixth intermediate bit at an output terminal thereof;

a thirteenth NOT gate (210) for receiving and inverting the sixth intermediate bit to generate an inverted sixth intermediate bit;

a fourteenth NOT gate (212) for receiving and inverting the fourth bit of the modified first binary value to generate an inverted fourth bit of the modified first binary value;

a fifteenth NOT gate (214) for receiving and inverting the third bit of the modified first binary value to generate an inverted third bit of the modified first binary value;

a third NAND gate (228), connected to the thirteenth through fifteenth NOT gates, for receiving the inverted sixth intermediate bit, and inverted third and fourth bits of the modified first binary value at first through third input terminals thereof, respectively, and generating a seventh intermediate bit at an output terminal thereof;

a sixteenth NOT gate (216) for receiving and inverting the seventh intermediate bit to generate an inverted seventh intermediate bit;

a seventeenth NOT gate (218) for receiving and inverting the fifth bit of the modified first binary value to generate an inverted fifth bit of the modified first binary value;

a fourth NAND gate (230) connected to the sixteenth, seventeenth, and eleventh NOT gates for receiving the inverted seventh intermediate and the inverted fifth and sixth bits of the modified first binary value at first through third input terminals thereof, respectively, and generating an eighth intermediate bit at an output terminal thereof;

an eighteenth NOT gate (220) for receiving and inverting the eighth bit of the modified first binary value to generate an inverted eighth bit of the modified first binary value;

a second logic circuit (244) connected to the tenth NOR gate for receiving the fourth intermediate bit and sixth and seventh bits of the modified first binary value and generating a ninth intermediate bit at an output terminal thereof;

a third logic circuit (246) connected to the second NAND gate, and the eleventh and fourteenth NOT gates, for receiving the fifth intermediate bit, the fifth bit, and the inverted fourth and sixth bits of the modified first binary value and generating a tenth intermediate bit at an output terminal thereof;

a nineteenth NOT gate (222) connected to the output terminal of the third logic circuit for receiving and inverting the tenth intermediate bit and generating an inverted tenth intermediate bit;

a fourth logic circuit (248) connected to the ninth and tenth NOR gates for receiving the third and fourth intermediate bits, and first bit of the modified first binary value and generating an eleventh intermediate bit at an output terminal thereof;

a fifth logic circuit (250) connected to the output terminal of the second logic circuit and the ninth NOR gate for receiving the third intermediate bit, the first bit of the modified first binary value, and the ninth intermediate bit and generating a twelfth intermediate bit at an output terminal thereof;

a sixth logic circuit (252) connected to the nineteenth NOT gate and the first NAND gate for receiving the first and inverted tenth intermediate bits, and the first and third bits of the modified first binary value and generating a thirteenth intermediate bit at an output terminal thereof;

a second OR gate (238) for receiving the first bit of the modified first binary value, a fourteenth intermediate bit, and generating a fifteenth intermediate bit at an output terminal thereof;

a third OR gate (240) connected to the tenth NOT gate for receiving the inverted first intermediate bit and a sixteenth intermediate bit and generating a seventeenth intermediate bit at an output terminal thereof;

a seventh logic circuit (254) connected to the first OR gate and the fifteenth NOT gate for receiving the sixth intermediate bit, the inverted third bit of the modified first binary value, and an inverted eighteenth intermediate bit and generating a nineteenth intermediate bit at an output terminal thereof;

an eighth logic circuit (256) connected to the first OR gate and the fourteenth NOT gate for receiving the sixth intermediate bit, the third bit and inverted fourth bit of the modified first binary value, and an inverted twentieth intermediate bit and generating a twenty-first intermediate bit at an output terminal thereof;

a ninth logic circuit (258) connected to the output terminal of the third NAND gate, the seventeenth NOT gate for receiving the inverted fifth bit of the modified first binary value, the seventh intermediate bit, and an inverted twenty-second intermediate bit and generating a twenty-third intermediate bit at an output terminal thereof;

a tenth logic circuit (260) connected to the eleventh NOT gate and the third NAND gate for receiving the seventh intermediate bit, the fifth and inverted sixth bits of the modified first binary value, and an inverted twenty-fourth intermediate bit and generating a twenty-fifth intermediate bit at an output terminal thereof;

an eleventh logic circuit (262) connected to the twelfth NOT gate and the fourth NAND gate for receiving the inverted seventh bit of the modified first binary value, the eighth intermediate bit, and an inverted twenty-sixth intermediate bit and generating a twenty-seventh intermediate bit at an output terminal thereof;

a twelfth logic circuit (264) connected to the eighteenth NOT gate and the fourth NAND gate for receiving the eighth intermediate bit, the seventh and inverted eighth bits of the modified first binary value, and an inverted twenty-eighth intermediate bit and generating a twenty-ninth intermediate bit at an output terminal thereof;

a first flip-flop (266) having an input terminal for receiving the first bit of the modified first binary value, a clock input terminal for receiving a system clock signal, and a reset input terminal for receiving a system reset signal, wherein the first flip-flop generates a fourth bit of the position binary value at an output terminal thereof;

a second flip-flop (268) having an input terminal connected to the output terminal of the fourth logic circuit for receiving the eleventh intermediate bit, a clock input terminal for receiving the system clock signal, and a reset input terminal for receiving the system reset signal, wherein the second flip-flop generates a third bit of the position binary value at an output terminal thereof;

a third flip-flop (270) having an input terminal connected to the output terminal of the fifth logic circuit for receiving the twelfth intermediate bit, a clock input terminal for receiving the system clock signal, and a reset input terminal for receiving the system reset signal, wherein the third flip-flop generates a second bit of the position binary value at an output terminal thereof;

a fourth flip-flop (272) having an input terminal connected to the output terminal of the sixth logic circuit for receiving the thirteenth intermediate bit, a clock input terminal for receiving the system clock signal, and a reset input terminal for receiving the system reset signal, wherein the fourth flip-flop generates a first bit of the position binary value at an output terminal thereof;

a fifth flip-flop (274) having an input terminal connected to the output terminal of the second OR gate for receiving the fifteenth intermediate bit, a clock input terminal for receiving the system clock signal, and a reset input terminal for receiving the system reset signal, wherein the fifth flip-flop generates the fourteenth intermediate bit at an output terminal thereof;

a sixth flip-flop (276) having an input terminal connected to the output terminal of the third OR gate for receiving the seventeenth intermediate bit, a clock input terminal for receiving the system clock signal, and a reset input terminal for receiving the system reset signal, wherein the sixth flip-flop generates the sixteenth intermediate bit at an output terminal thereof;

a seventh flip-flop (278) having an input terminal connected to the output terminal of the seventh logic circuit for receiving the nineteenth intermediate bit, a clock input terminal for receiving the system clock signal, and a reset input terminal for receiving the system reset signal, wherein the seventh flip-flop generates the eighteenth and inverted eighteenth intermediate bits at first and second output terminals, thereof, respectively;

an eighth flip-flop (280) having an input terminal connected to the output terminal of the eighth logic circuit for receiving the twenty-first intermediate bit, a clock input terminal for receiving the system clock signal, a reset input terminal for receiving the system reset signal, wherein the seventh flip-flop generates the twentieth and inverted twentieth intermediate bits at first and second output terminals, thereof, respectively;

a ninth flip-flop (282) having an input terminal connected to the output terminal of the ninth logic circuit for receiving the twenty-third intermediate bit, a clock input terminal for receiving the system clock signal, and a reset input terminal for receiving the system reset signal, wherein the ninth flip-flop generates the twenty-second and inverted twenty-second intermediate bits at first and second output terminals, thereof, respectively;

a tenth flip-flop (284) having an input terminal connected to the output terminal of the tenth logic circuit for receiving the twenty-fifth intermediate bit, a clock input terminal for receiving the system clock signal, and a reset input terminal for receiving the system reset signal, wherein the tenth flip-flop generates the twenty-fourth and inverted twenty-fourth intermediate bits at first and second output terminals, thereof, respectively;

an eleventh flip-flop (286) having an input terminal connected to the output terminal of the eleventh logic circuit for receiving the twenty-seventh intermediate bit, a clock input terminal for receiving the system clock signal, and a reset input terminal for receiving the system reset signal, wherein the eleventh flip-flop generates the twenty-sixth and inverted twenty-sixth intermediate bits at first and second output terminals, thereof, respectively; and a twelfth flip-flop (288) having an input terminal connected to the output terminal of the twelfth logic circuit for receiving the twenty-ninth intermediate bit, a clock input terminal for receiving the system clock signal, and a reset input terminal for receiving the system reset signal, wherein the twelfth flip-flop generates the twenty-eighth and inverted twenty-eighth intermediate bits at first and second output terminals, thereof, respectively;

a shifter circuit connected to the priority encoder for receiving the second binary value and the position binary value generated in a current iteration of the multiplier circuit, generating a first intermediate product by left-shifting the second binary value by a count equal to the position binary value, and generating a result acknowledgement signal when the multiplication of the first and second binary values is finished; and an accumulator connected to the shifter circuit for receiving and accumulating one or more intermediate products generated by the shifter circuit during one or more iterations of the multiplier circuit to generate a final product that is a product of the first and second binary values.

2. The multiplier circuit of claim 1, wherein the shifter circuit includes:

a thirteenth logic circuit for receiving the first through fourth bits of the position binary value and generating the result acknowledgement signal when the multiplication of the first and second binary values is finished; and a barrel shifter circuit for receiving the second binary value and the first through fourth bits of the position binary value and left-shifting the second binary value by the count equal to the position binary value to generate the first intermediate product.

3. The multiplier circuit of claim 2, wherein the thirteenth logic circuit includes:

an eleventh NOR gate for receiving the first through fourth bits of the position binary value and generating an input selection signal;

a first multiplexer having a first input terminal that receives an input signal, a second input terminal that receives the result acknowledgement signal, and a select input terminal connected to the eleventh NOR gate for receiving the input selection signal, wherein the first multiplexer selectively provides at least one of the first input and result acknowledgement signals at an output terminal thereof;

a twentieth NOT gate that receives the system reset signal and generates an inverted system reset signal; and a thirteenth flip-flop having an input terminal connected to the output terminal of the first multiplexer for receiving the at least one of the input and result acknowledgement signals, a clock input terminal that receives the system clock signal, and a reset input terminal connected to the twentieth gate for receiving the inverted system reset signal, wherein the thirteenth flip-flop generates the result acknowledgement and inverted result acknowledgement signals at first and second output terminals, thereof, respectively, wherein the first output terminal is connected to the first input terminal of the first multiplexer for transmitting the result acknowledgement signal thereto.

4. The multiplier circuit of claim 3, wherein the multiplier circuit is used in a calculation device.

5. A multiplier circuit for multiplying first and second binary values, comprising:
   a first logic circuit for receiving the first binary value and a multiplier modifier and resetting a set bit detected in a previous iteration of the multiplier circuit to generate a modified first binary value based on the multiplier modifier, wherein the first logic circuit comprises:
      first through eighth NOT gates for receiving first through eighth bits of the first binary value, respectively, and generating inverted first through eighth bits, respectively; and
      first through eighth NOR gates connected to the first through eighth NOT gates, respectively, and the priority encoder for receiving the inverted first through eighth bits of the first binary value and first through eighth bits of the multiplier modifier, and generating first through eighth bits of the modified first binary value;
   a priority encoder connected to the first logic circuit for receiving the modified first binary value, detecting a most significant set bit in the modified first binary value, generating a position binary value that includes a position of the most significant set bit, and generating the multiplier modifier, wherein the priority encoder comprises:
      a ninth NOT gate (202) for receiving and inverting the first bit of the modified first binary value to generate the inverted first bit of the modified first binary value;
      a first NAND gate (224) connected to the ninth NOT gate for receiving the inverted first bit and the second bit of the modified first binary value at first and second input terminals thereof, respectively, and generating a first intermediate bit at an output terminal thereof;
      a tenth NOT gate (204) connected to the output terminal of the first NAND gate for receiving the first intermediate bit and generating an inverted first intermediate bit;
      a first AND gate (242) connected to the tenth NOT gate for receiving the inverted first intermediate bit and the third bit of the modified first binary value and generating a second intermediate bit at an output terminal thereof;
      a ninth NOR gate (232) connected to the output terminal of the first AND gate and the ninth NOT gate for receiving the second intermediate bit and the inverted first bit of the modified first binary value and generating a third intermediate bit at an output terminal thereof;
      a tenth NOR gate (234) for receiving the fourth and fifth bits of the modified first binary value and generating a fourth intermediate bit at an output terminal thereof;
      an eleventh NOT gate (206) for receiving and inverting the sixth bit of the modified first binary value to generate an inverted sixth bit of the modified first binary value;
      a twelfth NOT gate (208) for receiving and inverting the seventh bit of the modified first binary value to generate an inverted seventh bit of the modified first binary value;
      a second NAND gate (226) connected to the twelfth NOT gate for receiving the eighth and inverted seventh bits of the modified first binary value at first and second input terminals thereof, respectively, and generating a fifth intermediate bit at an output terminal thereof;
      a first OR gate (236) for receiving the first and second bits of the modified first binary value at first and second input terminals thereof, respectively, and generating a sixth intermediate bit at an output terminal thereof;
      a thirteenth NOT gate (210) for receiving and inverting the sixth intermediate bit to generate an inverted sixth intermediate bit;
      a fourteenth NOT gate (212) for receiving and inverting the fourth bit of the modified first binary value to generate an inverted fourth bit of the modified first binary value;
      a fifteenth NOT gate (214) for receiving and inverting the third bit of the modified first binary value to generate an inverted third bit of the modified first binary value;
      a third NAND gate (228), connected to the thirteenth through fifteenth NOT gates, for receiving the inverted sixth intermediate bit, and inverted third and fourth bits of the modified first binary value at first through third input terminals thereof, respectively, and generating a seventh intermediate bit at an output terminal thereof;
      a sixteenth NOT gate (216) for receiving and inverting the seventh intermediate bit to generate an inverted seventh intermediate bit;
      a seventeenth NOT gate (218) for receiving and inverting the fifth bit of the modified first binary value to generate an inverted fifth bit of the modified first binary value;
      a fourth NAND gate (230) connected to the sixteenth, seventeenth, and eleventh NOT gates for receiving the inverted seventh intermediate and the inverted fifth and sixth bits of the modified first binary value at first through third input terminals thereof, respectively, and generating an eighth intermediate bit at an output terminal thereof;
      an eighteenth NOT gate (220) for receiving and inverting the eighth bit of the modified first binary value to generate an inverted eighth bit of the modified first binary value;
      a second logic circuit (244) connected to the tenth NOR gate for receiving the fourth intermediate bit and sixth and seventh bits of the modified first binary value and generating a ninth intermediate bit at an output terminal thereof;
      a third logic circuit (246) connected to the second NAND gate, and the eleventh and fourteenth NOT gates, for receiving the fifth intermediate bit, the fifth bit, and the inverted fourth and sixth bits of the modified first binary value and generating a tenth intermediate bit at an output terminal thereof;
      a nineteenth NOT gate (222) connected to the output terminal of the third logic circuit for receiving and inverting the tenth intermediate bit and generating an inverted tenth intermediate bit;
      a fourth logic circuit (248) connected to the ninth and tenth NOR gates for receiving the third and fourth intermediate bits, and first bit of the modified first binary value and generating an eleventh intermediate bit at an output terminal thereof;
      a fifth logic circuit (250) connected to the output terminal of the second logic circuit and the ninth NOR gate for receiving the third intermediate bit, the first bit of the modified first binary value, and the ninth intermediate bit and generating a twelfth intermediate bit at an output terminal thereof;
a sixth logic circuit (252) connected to the nineteenth NOT gate and the first NAND gate for receiving the first and inverted tenth intermediate bits, and the first and third bits of the modified first binary value and generating a thirteenth intermediate bit at an output terminal thereof;
a second OR gate (238) for receiving the first bit of the modified first binary value, a fourteenth intermediate bit, and generating a fifteenth intermediate bit at an output terminal thereof;
a third OR gate (240) connected to the tenth NOT gate for receiving the inverted first intermediate bit and a sixteenth intermediate bit and generating a seventeenth intermediate bit at an output terminal thereof;
a seventh logic circuit (254) connected to the first OR gate and the fifteenth NOT gate for receiving the sixth intermediate bit, the inverted third bit of the modified first binary value, and an inverted eighteenth intermediate bit and generating a nineteenth intermediate bit at an output terminal thereof;
an eighth logic circuit (256) connected to the first OR gate and the fourteenth NOT gate for receiving the sixth intermediate bit, the third bit and inverted fourth bit of the modified first binary value, and a inverted twentieth intermediate bit and generating a twenty-first intermediate bit at an output terminal thereof;
a ninth logic circuit (258) connected to the output terminal of the third NAND gate, the seventeenth NOT gate for receiving the inverted fifth bit of the modified first binary value, the seventh intermediate bit, and an inverted twenty-second intermediate bit and generating a twenty-third intermediate bit at an output terminal thereof;
a tenth logic circuit (260) connected to the eleventh NOT gate and the third NAND gate for receiving the seventh intermediate bit, the fifth and inverted sixth bits of the modified first binary value, and an inverted twenty-fourth intermediate bit and generating a twenty-fifth intermediate bit at an output terminal thereof;
an eleventh logic circuit (262) connected to the twelfth NOT gate and the fourth NAND gate for receiving the inverted seventh bit of the modified first binary value, the eighth intermediate bit, and an inverted twenty-sixth intermediate bit and generating a twenty-seventh intermediate bit at an output terminal thereof;
a twelfth logic circuit (264) connected to the eighteenth NOT gate and the fourth NAND gate for receiving the eighth intermediate bit, the seventh and inverted eighth bits of the modified first binary value, and an inverted twenty-eighth intermediate bit and generating a twenty-ninth intermediate bit at an output terminal thereof;
a first flip-flop (266) having an input terminal for receiving the first bit of the modified first binary value, a clock input terminal for receiving a system clock signal, and a reset input terminal for receiving a system reset signal, wherein the first flip-flop generates a fourth bit of the position binary value at an output terminal thereof;
a second flip-flop (268) having an input terminal connected to the output terminal of the fourth logic circuit for receiving the eleventh intermediate bit, a clock input terminal for receiving the system clock signal, and a reset input terminal for receiving the system reset signal, wherein the second flip-flop generates a third bit of the position binary value at an output terminal thereof;
a third flip-flop (270) having an input terminal connected to the output terminal of the fifth logic circuit for receiving the twelfth intermediate bit, a clock input terminal for receiving the system clock signal, and a reset input terminal for receiving the system reset signal, wherein the third flip-flop generates a second bit of the position binary value at an output terminal thereof;
a fourth flip-flop (272) having an input terminal connected to the output terminal of the sixth logic circuit for receiving the thirteenth intermediate bit, a clock input terminal for receiving the system clock signal, and a reset input terminal for receiving the system reset signal, wherein the fourth flip-flop generates a first bit of the position binary value at an output terminal thereof;
a fifth flip-flop (274) having an input terminal connected to the output terminal of the second OR gate for receiving the fifteenth intermediate bit, a clock input terminal for receiving the system clock signal, and a reset input terminal for receiving the system reset signal, wherein the fifth flip-flop generates the fourteenth intermediate bit at an output terminal thereof;
a sixth flip-flop (276) having an input terminal connected to the output terminal of the third OR gate for receiving the seventeenth intermediate bit, a clock input terminal for receiving the system clock signal, and a reset input terminal for receiving the system reset signal, wherein the sixth flip-flop generates the sixteenth intermediate bit at an output terminal thereof;
a seventh flip-flop (278) having an input terminal connected to the output terminal of the seventh logic circuit for receiving the nineteenth intermediate bit, a clock input terminal for receiving the system clock signal, and a reset input terminal for receiving the system reset signal, wherein the seventh flip-flop generates the eighteenth and inverted eighteenth intermediate bits at first and second output terminals, thereof, respectively;
an eighth flip-flop (280) having an input terminal connected to the output terminal of the eighth logic circuit for receiving the twenty-first intermediate bit, a clock input terminal for receiving the system clock signal, a reset input terminal for receiving the system reset signal, wherein the seventh flip-flop generates the twentieth and inverted twentieth intermediate bits at first and second output terminals, thereof, respectively;
a ninth flip-flop (282) having an input terminal connected to the output terminal of the ninth logic circuit for receiving the twenty-third intermediate bit, a clock input terminal for receiving the system clock signal, and a reset input terminal for receiving the system reset signal, wherein the ninth flip-flop generates the twenty-second and inverted twenty-second intermediate bits at first and second output terminals, thereof, respectively;
a tenth flip-flop (284) having an input terminal connected to the output terminal of the tenth logic circuit for receiving the twenty-fifth intermediate bit, a clock input terminal for receiving the system clock signal, and a reset input terminal for receiving the system reset signal, wherein the tenth flip-flop generates the twenty-fourth and inverted twenty-fourth intermediate bits at first and second output terminals, thereof, respectively;

an eleventh flip-flop (286) having an input terminal connected to the output terminal of the eleventh logic circuit for receiving the twenty-seventh intermediate bit, a clock input terminal for receiving the system clock signal, and a reset input terminal for receiving the system reset signal, wherein the eleventh flip-flop generates the twenty-sixth and inverted twenty-sixth intermediate bits at first and second output terminals, thereof, respectively; and a twelfth flip-flop (288) having an input terminal connected to the output terminal of the twelfth logic circuit for receiving the twenty-ninth intermediate bit, a clock input terminal for receiving the system clock signal, and a reset input terminal for receiving the system reset signal, wherein the twelfth flip-flop generates the twenty-eighth and inverted twenty-eighth intermediate bits at first and second output terminals, thereof, respectively;

a shifter circuit connected to the priority encoder for receiving the second binary value and the position binary value generated in a current iteration of the multiplier circuit, generating a first intermediate product by left-shifting the second binary value by a count equal to the position binary value, and generating a result acknowledgement signal when the multiplication of the first and second binary values is finished, wherein the shifter circuit comprises:

an eleventh NOR gate for receiving the first through fourth bits of the position binary value and generating an input selection signal;

a first multiplexer having a first input terminal that receives an input signal, a second input terminal that receives the result acknowledgement signal, and a select input terminal connected to the eleventh NOR gate for receiving the input selection signal, wherein the first multiplexer selectively provides at least one of the first input and result acknowledgement signals at an output terminal thereof;

a twentieth NOT gate that receives the system reset signal and generates an inverted system reset signal; and a thirteenth flip-flop having an input terminal connected to the output terminal of the first multiplexer for receiving the at least one of the input and result acknowledgement signals, a clock input terminal that receives the system clock signal, and a reset input terminal connected to the twentieth NOT gate for receiving the inverted system reset signal, wherein the thirteenth flip-flop generates the result acknowledgement and inverted result acknowledgement signals at first and second output terminals, thereof, respectively, wherein the first output terminal is connected to the first input terminal of the first multiplexer for transmitting the result acknowledgement signal thereto; and a barrel shifter circuit for receiving the second binary value and the first through fourth bits of the position binary value and left-shifting the second binary value by the count equal to the position binary value to generate the first intermediate product; and an accumulator connected to the shifter circuit for receiving and accumulating one or more intermediate products generated by the shifter circuit during one or more iterations of the multiplier circuit to generate a final product that is a product of the first and second binary values.

\* \* \* \* \*